United States Patent
Hettiger et al.

(10) Patent No.: US 7,343,726 B2
(45) Date of Patent: Mar. 18, 2008

(54) HARVESTING MACHINE WITH A DISCHARGE ASSEMBLY

(75) Inventors: Marcus Hettiger, Saarbrücken (DE); Karl Hammerschmid, Dunzweiler (DE)

(73) Assignee: Deere & Company, Moline, IL (US)

( * ) Notice: Subject to any disclaimer, the term of this patent is extended or adjusted under 35 U.S.C. 154(b) by 364 days.

(21) Appl. No.: 11/110,472

(22) Filed: Apr. 20, 2005

(65) Prior Publication Data
US 2005/0235623 A1 Oct. 27, 2005

(30) Foreign Application Priority Data
Apr. 24, 2004 (DE) .................... 10 2004 020 127

(51) Int. Cl.
*A01D 61/00* (2006.01)
(52) U.S. Cl. .................... 56/16.6; 56/13.3; 460/114
(58) Field of Classification Search ............... 56/114, 56/115, 119, 13.3, 16.6; 414/505, 523; 460/111, 460/114, 115
See application file for complete search history.

(56) References Cited

U.S. PATENT DOCUMENTS

| | | | |
|---|---|---|---|
| 4,742,938 A * | 5/1988 | Niewold | 222/381 |
| 5,558,282 A * | 9/1996 | Ameye et al. | 241/60 |
| 5,749,783 A * | 5/1998 | Pollklas | 460/119 |
| 6,638,159 B2 * | 10/2003 | Krone et al. | 460/114 |
| 6,932,554 B2 * | 8/2005 | Isfort et al. | 414/397 |
| 2004/0053653 A1 | 3/2004 | Isfort et al. | |

FOREIGN PATENT DOCUMENTS

| | | |
|---|---|---|
| DE | 32 24 269 | 3/1983 |
| DE | 264 602 | 2/1989 |
| DE | 44 03 893 | 2/1994 |
| DE | 101 19 279 | 4/2001 |
| DE | 102 42 164 | 9/2002 |
| EP | 1 219 153 | 7/2002 |
| EP | 1 250 832 | 10/2002 |
| EP | 1 393 613 | 3/2004 |

OTHER PUBLICATIONS

German Search Report, Jul. 10, 2007, 3 Pages.

* cited by examiner

*Primary Examiner*—Thomas B. Will
*Assistant Examiner*—Alicia Torres

(57) ABSTRACT

A harvesting machine with a discharge assembly for the transfer of harvested crop to a transport vehicle includes an actuator that is adapted to move the discharge assembly about a horizontal axis, thereby adjusting the height of the outlet end of the discharge assembly. A stop element can be moved between an active position and an inactive position. In the active position, the stop element limits the range of movement of the actuator such that the discharge assembly cannot be moved to a position that is lower than a lowest active position. In the inactive position, the stop element does not limit the range of movement of the actuator, thus the discharge assembly can be moved to a position that is lower than the lowest active position. Therefore, the discharge assembly remains above the lowest active position during the harvesting operation.

12 Claims, 4 Drawing Sheets

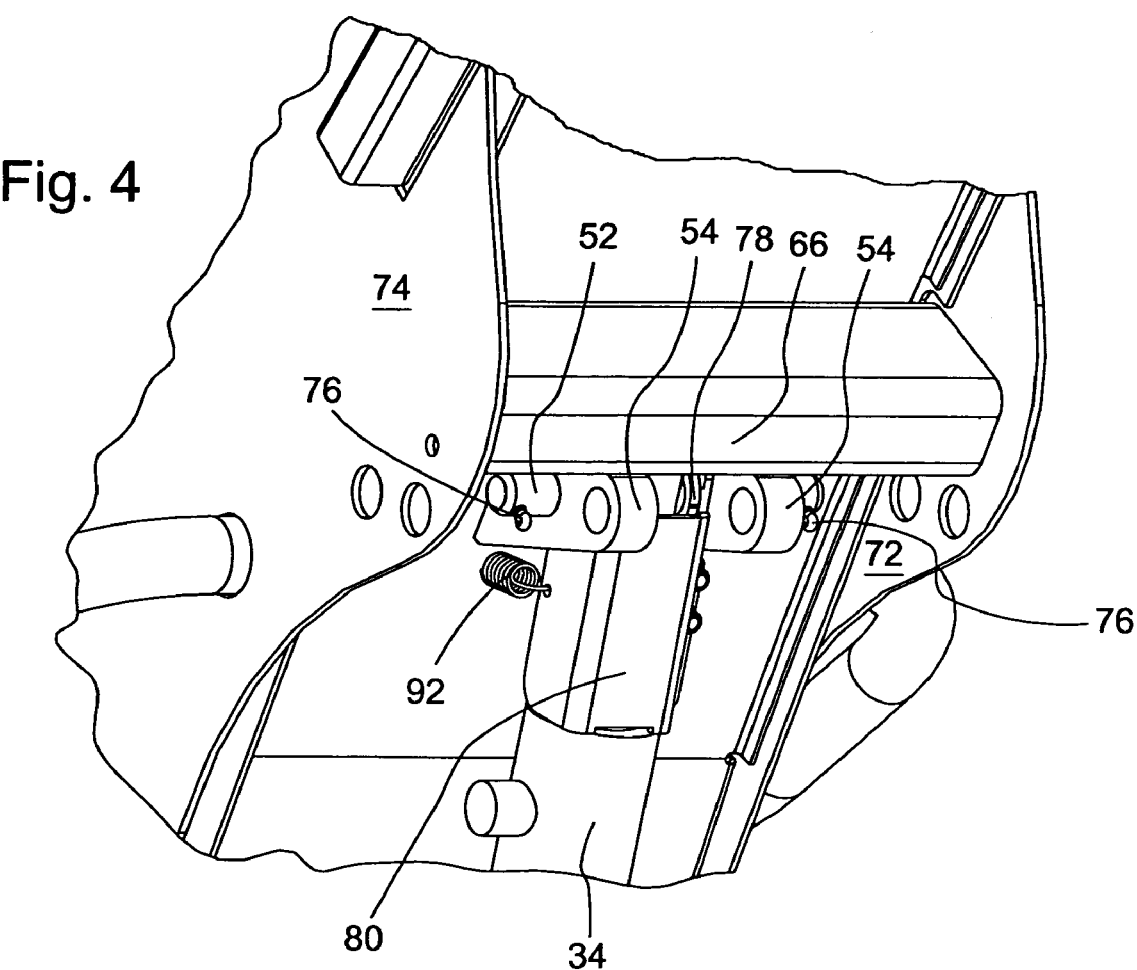
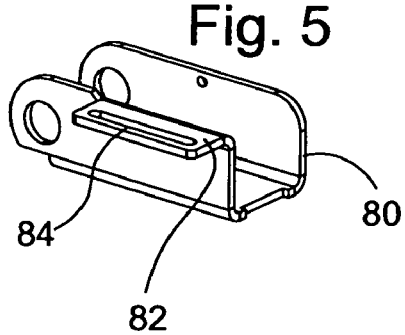
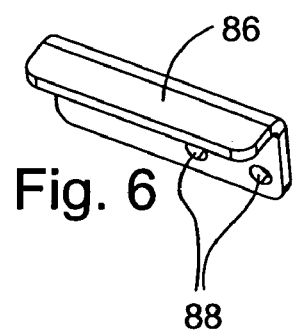
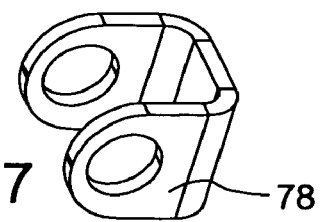

HARVESTING MACHINE WITH A DISCHARGE ASSEMBLY

FIELD OF THE INVENTION

The present invention relates to a harvesting machine with a discharge assembly for the transfer of harvested crop to a transport vehicle. More specifically, the present invention relates to a harvesting machine with a discharge assembly having an actuator adapted to allow movement of the discharge assembly about a horizontal axis, thereby allowing the height of the outlet end of the discharge assembly to be varied.

BACKGROUND OF THE INVENTION

Forage harvesters are agricultural harvesting machines that take up crop standing on a field during the harvesting operation, chop it, and deliver it to a transport vehicle through a discharge assembly such as an ejection elbow, ejection bow or transfer assembly. The position of the discharge assembly on the forage harvester can be adjusted in order to hit the transport vehicle as closely as possible and to load the transport vehicle uniformly. As a rule the discharge assembly can be rotated about the vertical axis and pivoted about a horizontal axis, in order to be able to adjust the height of the outlet end. Moreover a pivoted outlet flap is attached to the outlet end in order to control the ejection direction of the harvested crop. The aforementioned movements are performed by actuators that are actuated by an outside force such as hydraulic cylinders.

For transport operation on public roads the usual practice is to bring the discharge assembly into a transport position wherein it extends from the pivot bearing to the rear and its outlet end rests upon a deposit assembly. In some cases the harvesting machines are to be transported on a truck, a railroad freight car, a ship or the like. The discharge assembly is generally the highest point of the harvesting machine, even when in the transport position. In order to avoid exceeding the dimensions established for the transportation in traffic on public roads, the discharge assembly could be removed, however, this is very costly. It is also known to use so-called transport brackets, in order to bring the discharge assembly into a loading position that is lower than the transport position. The attachment and disassembly of the transport brackets, however, is relatively time consuming and error prone. The range of downward movement of the discharge assembly could also be enlarged, but this has the disadvantage that an operator could unintentionally put the discharge assembly in an inappropriate position during the harvesting operation.

Therefore, there is a need for an improved harvesting machine having a discharge assembly that overcomes these problems.

SUMMARY OF THE INVENTION

The problems discussed above are addressed according to the teachings of the present invention. In an aspect of the present invention, the discharge assembly includes a stop element that limits the range of downward movement of the discharge assembly. When the stop element is in an active position, the outlet end of the discharge assembly cannot be moved to a position that is lower than the lowest operating position. The stop element can be placed in an inactive position, wherein the outlet end of the discharge assembly can be moved into a position lower than the lowest operating position of the discharge assembly. Therefore, the discharge assembly can be moved during the harvesting operation between a highest operating position and a lowest operating position when the stop element is activated.

In another aspect, the range of movement of the actuator is selected to be large enough that the discharge assembly can be lowered into a transport position that is lower than the operating position, for transportation on a truck, trailer or the like, only when the stop element is inactive. The actuator is preferably located to one side, immediately adjacent the discharge assembly on the rear of the harvesting machine and at a height below the support surface of the deposit assembly for the discharge assembly. In this way, additional movement of the discharge assembly during the transport loading can be avoided. The limited range of movement of the discharge assembly during the harvesting operation prevents the operator from inadvertently bringing the outlet end of the discharge assembly into an inappropriate position that is too low. The invention is appropriate for all harvesting machines with discharge assemblies that can be adjusted in height, such as, for example, forage harvesters and sugar cane harvesters.

In still another aspect, the actuator is a hydraulic cylinder that is positioned between and interconnects the discharge assembly and a turning circle or an element connected to the turning circle. The turning circle can be rotated about a vertical or approximately vertical axis by another actuator. A piston rod of the cylinder of the actuator is pivotally connected to the discharge assembly, while the opposite end of the cylinder is pivotally connected to the turning circle. A reverse assembly is also conceivable wherein the cylinder is pivotally connected to the discharge assembly and the piston rod is pivotally connected to the turning circle. An obvious solution is to attach the stop element in the active position between the axis and the cylinder in order to limit the range of movement of the actuator and thereby the discharge assembly. In the inactive position it is removed from this position, which can be performed manually or by an actuator actuated by outside forces.

In yet another aspect, the stop element is supported in bearings and is free to rotate about the axis. However, the stop element can also be removable or can be moved between an active and an inactive position. Preferably the stop element is preloaded into the active position, for example, by a spring. As long as no other external forces act upon it, the stop element remains active.

In still another aspect, the stop element is configured such that the stop element can be retained in the inactive position for a period of time and then to return to the active position again. An adjusting element is moveable relative to the stop element between a retracted position and an extended position. In the extended position, the adjusting element is in contact with the cylinder of the actuator. This allows the actuator to be brought into a position where the discharge assembly is located above the lowest operating position. When this happens, the stop element is no longer retained by contact with the cylinder, and therefore, the stop element moves to the inactive position. The adjusting element extends to contact the cylinder and retains the stop element in the inactive position. Now the actuator can lower the discharge assembly into the loading position. The movements of the stop element and the adjusting element as described can be performed manually or by appropriate actuators, actuated by external forces.

If the discharge assembly is again raised after resuming harvesting operations and the piston rod is extended for this purpose, the adjusting element and, initially, also the stop element, slide along the cylinder. When a pre-set height is reached the stop element is again brought into the active position by the preload. The adjusting element again reaches the retracted position as soon as the discharge assembly is subsequently lowered.

DESCRIPTION OF THE DRAWINGS

The above, as well as other advantages of the present invention, will become readily apparent to those skilled in the art from the following detailed description of a preferred embodiment when considered in the light of the accompanying drawings in which:

FIG. 4 is a perspective left side view of the assembly shown in FIG. 3;

FIG. 5 is a perspective view of a stop element adapted to limit the range of movement of the actuator;

FIG. 6 is a perspective view of an adjusting element adapted to limit the range of movement of the actuator;

FIG. 7 is a perspective view of a spacer adapted to limit the range of movement of the actuator;

DESCRIPTION OF THE EMBODIMENTS

Figure 1:
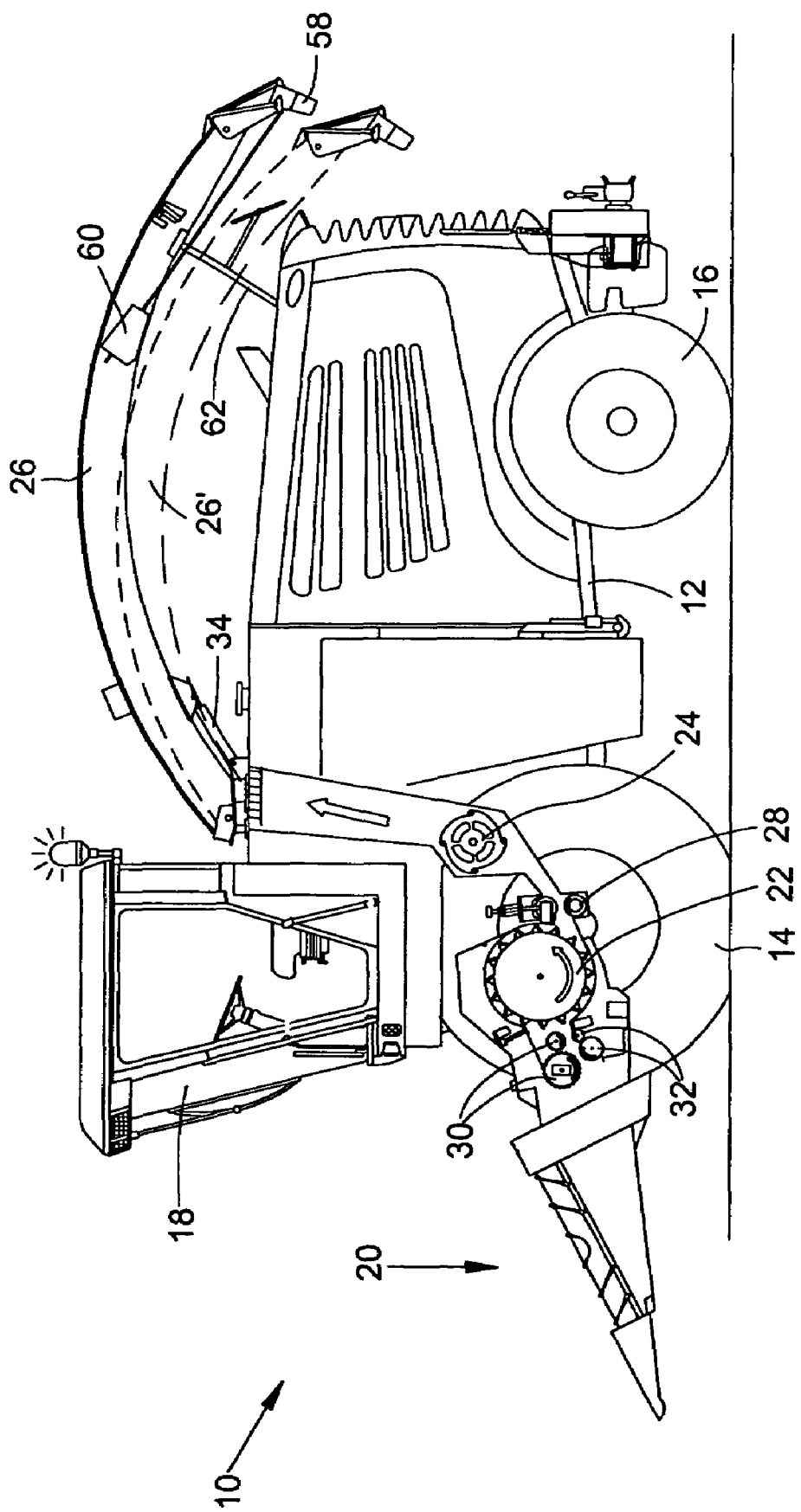
FIG. 1 is a schematic side view of a harvesting machine in accordance with the teachings of the present invention.

A harvesting machine 10 in the form of a self-propelled forage harvester is shown generally in FIG.1. The harvesting machine 10 is supported on a frame 12 that is carried on driven front wheels 14 and steerable rear wheels 16. The harvesting machine 10 is controlled by an operator in the operator's cab 18 from which a crop recovery assembly 20 can be controlled while being viewed by the operator. Crop, such as corn, grass or the like, is taken up from the ground by the crop recovery assembly 20, such as a corn head shown in FIG. 1, and conducted by means of upper rough pressing rolls 30 and lower rough pressing rolls 32 to a chopper drum 22 that chops the crop into small pieces and delivers the crop to a conveyor assembly 24. The crop leaves the harvesting machine 10 and is delivered to an accompanying trailer over a discharge assembly 26 that may be adjusted by rotating it about an upright axis. A post-chopper reduction assembly 28 extends between the chopper drum 22 and the conveyor assembly 24. The crop is transferred tangentially to the conveyor assembly through the chopper reduction assembly 28. The discharge assembly 26 has an inverted U cross sectional shape, and is therefore generally open downward since the harvested crop slides along the upperside of the sheet metal over of the discharge assembly 26 due to centrifugal force and is guided in the sideways direction by the sheet metal sides of discharge assembly 26.

Figure 2:
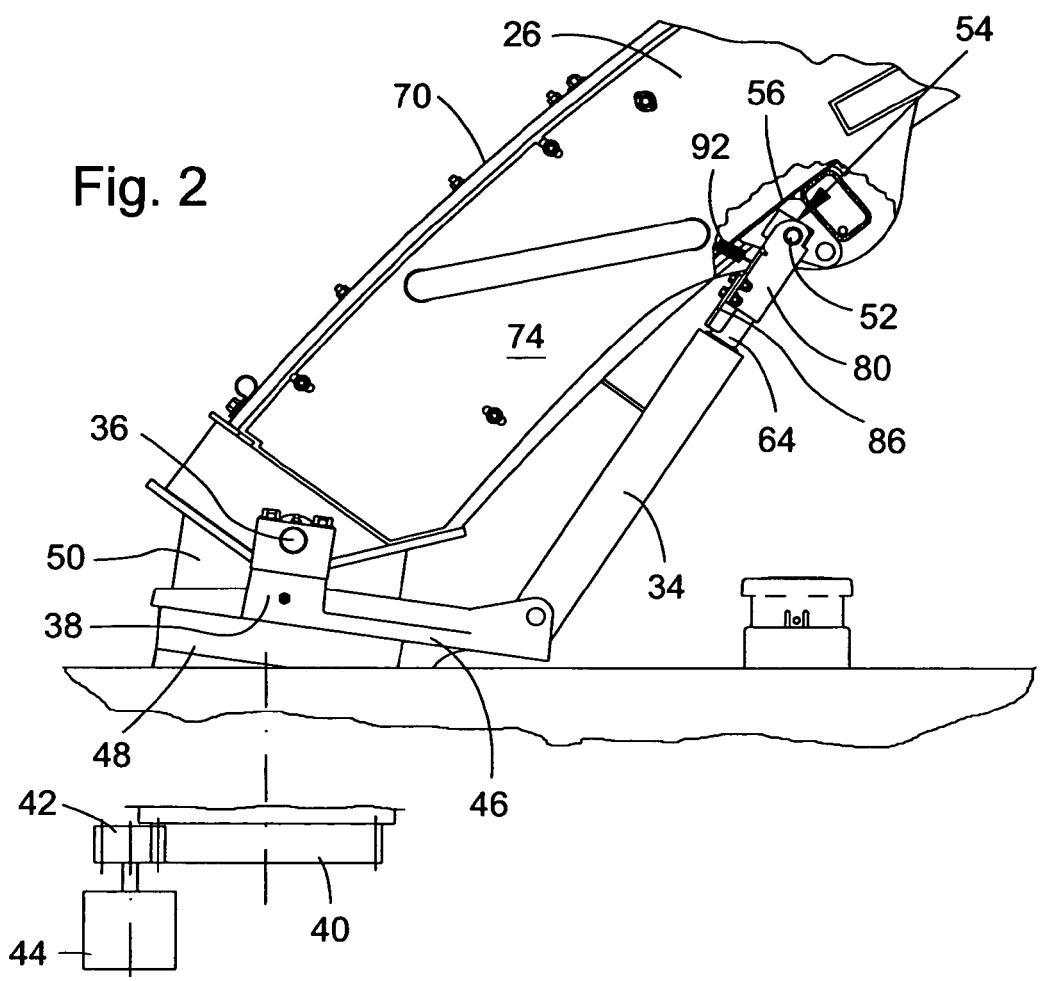
FIG. 2 is an enlarged side view of the pivot bearing assembly of the discharge assembly and the associated actuator positioned to move the discharge assembly about a horizontal axis to adjust the height of the outlet end.

As can be seen in FIGS. 1 and 2, the discharge assembly 26 can be pivoted more or less at its lower end about its horizontal axis 36 by an actuator 34, depending on the rotational position of the discharge assembly 26 about the vertical axis. A bearing assembly that can be rotated about the axis 36 extends between each of the lower side wall regions of the discharge assembly 26 and a retaining assembly 38. The retaining assembly 38 is fastened by a pipe 48 to a turning circle 40 that is supported by bearings, free to rotate relative to the frame 12 and is provided with gear teeth on its circumference. A gear 42 meshes with the gear teeth of the turning circle 40, and can be brought into rotation by a hydraulically or electrically driven motor 44. Thus, the turning circle 40 and discharge assembly 26 can be rotated together about an axis of rotation that is almost vertical but is inclined slightly to the rear in a direction opposite the direction of operation of the harvesting machine 10.

The pipe 48 is connected with the retaining assembly 38 by a flange 46. The lower piston end of the cylinder is also pivotally connected to the flange 46. The actuator 34 may be a hydraulic cylinder. The piston rod 64 of the actuator 34 is pivotally connected by an axis 52 to a fork-shaped bracket 54 (see FIGS. 3 and 4), which is in turn attached to a sheet metal floor 56 of the discharge assembly 26. A pipe 50, fixed to the frame, is positioned within the pipe 48 that rotates with the turning circle 40. The pipe 50 extends upward from the outlet of the conveyor assembly 24 and delivers the harvested crop about the retaining assembly 38 into the discharge assembly 26. Furthermore, a pivoted ejection flap 58 is pivotally connected at the outlet end of the discharge assembly 26, wherein the position of the ejection flap 58 can be varied by an actuator 60.

Thereby the actuators 34, 60, and motor 44 permit a repositioning of the discharge assembly 26, in order to be able to deposit the harvested crop on a transport vehicle. The motor 44 rotates the discharge assembly 26 about an approximately vertical axis, while the actuator 34 controls the height of the ejection end by pivoting about the horizontal axis 36. The actuator 34 is a single-acting cylinder, but in another embodiment could also be a double-acting cylinder. The control of the actuators 34, 60, and motor 44 can be performed by an operator in the operator's cab 18 by means of appropriate input devices. The harvesting machine 10 could also use pre-programmed positions or automatically orient the discharge assembly 26 by means of appropriate sensors, so that the harvested crop reaches the transport vehicle. In the position shown in FIG. 1, the discharge assembly 26 rests with the outlet end on a deposit assembly 62 at the rear end of which is in turn attached to a sheet metal floor 56 of the discharge assembly 26. A pipe 50, fixed to the frame, is positioned within the pipe 48 that rotates with the turning circle 40. This pipe 50 extends upward from the outlet of the conveyor assembly 24 and delivers the harvested crop above the retaining assembly 38 into the discharge assembly 26. Furthermore a pivoted ejection flap 58 is pivotally connected at the outlet end of the discharge assembly 26, wherein the position of the ejection flap 58 can be varied by an actuator 60.

Thereby the actuators 34, 60, and motor 44 permit a repositioning of the discharge assembly 26, in order to be able to deposit the harvested crop on a transport vehicle. The motor 44 rotates the discharge assembly 26 about an approximately vertical axis, while the actuator 34 controls the height of the ejection end by pivoting about the horizontal axis 36. The actuator 34 is a single-acting cylinder, but in another embodiment it could also be a double-acting cylinder. The control of the actuators 34, 60, and motor 44 can be performed by an operator in the operator's cab 18 by means of appropriate input devices. The harvesting machine 10 could also use pre-programmed positions or automatically orient the discharge assembly 26 by means of appropriate sensors, so that the harvested crop reaches the transport vehicle. In the position shown in FIG. 1 the discharge assembly 26 rests with the outlet end on a deposit assembly 62 at the rear end of the harvesting machine 10, this is a stand composed of pipes that is similar to the guide strut of a lawn mower. This position can be used immediately on a field that is not being harvested at that time, and for operation of the harvesting machine 10 on public roads. However in this position the discharge assembly 26 is too high to transport the harvesting machine on a truck, trailer, railroad freight car, ship or the like.

Figure 3:
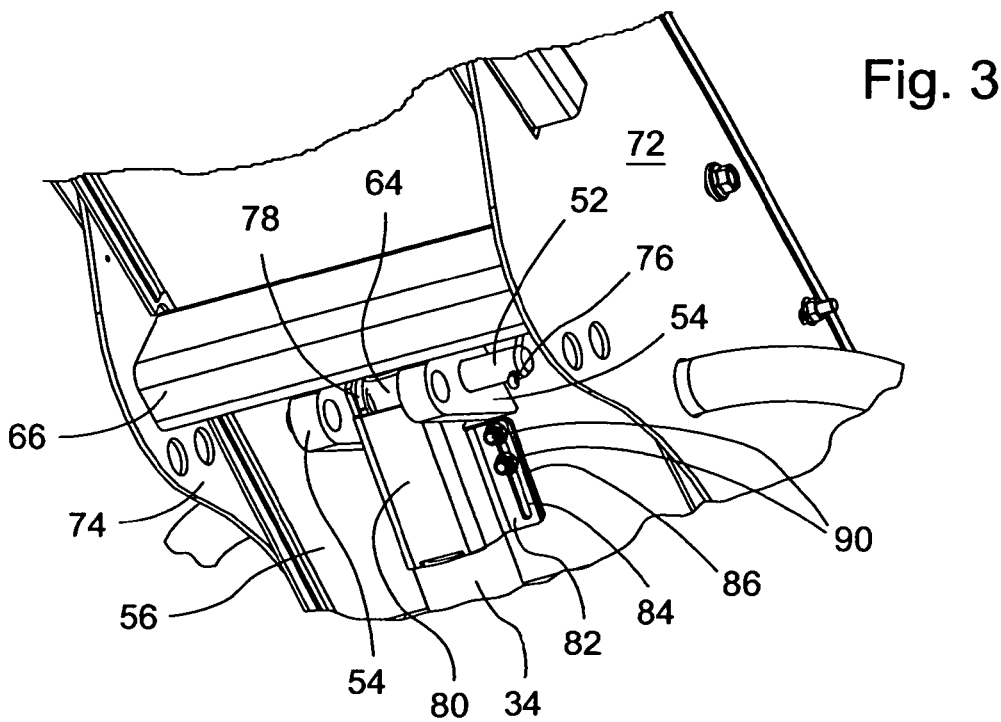
FIG. 3 is a perspective right side view of an assembly for limiting the range of movement of the actuator in the active position.

The attachment of the piston rod 64 of the actuator 34 to the sheet metal floor 56 over the fork-shaped bracket 54 can be seen in FIGS. 3 and 4. The sheet metal floor 56 extends parallel to and at a distance from the sheet metal cover 70 of the discharge assembly 26 such that the harvested crop is guided between the sheet metal floor 56 and the sheet metal cover 70. The sheet metal floor 56 is welded to the side walls 72, 74 of the discharge assembly 26. A reinforcing strut 66 extends between the side walls 72, 74 and is also welded to the sheet metal floor 56. The fork-shaped bracket 54 is welded to the sheet metal floor 56. Each of the legs of the fork-shaped bracket 54 are provided with an opening through which the axis 52 extends. The axis 52 further extends through a bore at the upper end of the piston rod 64. The axis 52 is fixed in position by two cotter pins 76 that extend through bores in the axis 52 on the outside of the legs of the bracket 54. A leg penetrated by a hole of a U-shaped spacer 78 is located between the legs of the fork-shaped bracket 54 and the piston rod 64. The bottom part of the spacer 78 is in contact with the sheet metal floor 56. The spacer 78 is shown generally in FIG. 7.

Moreover between each of the legs of the bracket 54 and the legs of the spacer 78, the legs of a stop element 80 are positioned, as shown in FIG. 5. The stop element 80 is provided with a U-shaped profile, where openings are arranged at the end region of the legs through which the axis 52 extends. With different dimensioning of the bracket 54 and the stop element 80, the spacer 78 could also be omitted.

The length of the stop element 80 is dimensioned in such a way that an upper edge of the cylinder of the actuator 34 is in contact with the stop element 80 ;when the discharge assembly 26 is in the position shown in FIG. 1. That is, the lower edges of the opposite sides of the discharge assembly 26 rests upon the deposit assembly 62 and the stop element 80 is in contact with the sheet metal floor 56. Then the discharge assembly is not supported by the piston rod 64 of the actuator 34, but by the stop element 80 and the cylinder of the actuator 34 at the flange 46. If the actuator 34 is double-acting, appropriate measures must be taken that the piston rod 64 is retracted no more than is shown here.

The first leg of the stop element 80 shown at the right in FIG. 3 is provided with a region 82 angled to the outside in which an elongated hole 84 is formed. An adjusting element 86 with a right angle cross section is in flush contact with the angled region 82 and surrounds the edge between the first leg and the region 82. In the position shown in FIG. 3, the adjusting element 86 and the region 82 extend parallel to the sheet metal floor 56, where the adjusting element 86 is in contact with the sheet metal floor 56. The adjusting element 86 is provided with two bores 88 through which screws 90 extend. Both screws further penetrate the elongated hole 84 in the stop element 80 and are secured by nuts on the side facing away from the adjusting element 86. The attachment described makes it possible to slide the adjusting element 86 in the longitudinal direction of the elongated hole 84 relative to the stop element 80, so that it can be extended downward relative to the position shown in FIG. 3. The adjusting element 86 could also be pivotally connected to the stop element 80, such that the adjusting element is free to pivot about the longitudinal axis of one of the screws 90. A helical spring 92 extends between the second leg of the stop element 80 and the sheet metal floor 56 and preloads the stop element 80 in the position shown in FIGS. 3 and 4.

The screws 90 hold the adjusting element 86 in the position shown in FIGS. 3 and 4, that is, the retracted position, and the spring 92 holds the stop element 80 against the sheet metal floor 56. The discharge assembly 26 can be raised upward into any desired position by actuating the actuator 34. But the range of adjustment of the actuator 34 downward is limited by the stop element 80, as long as it is forced against the sheet metal floor 56 by the spring 92. Therefore in the positions shown in FIGS. 3 and 4 the discharge assembly 26 can be brought into the position required for the harvesting operation, since a position lower than that shown in FIG. 1 is not required.

Figure 8:
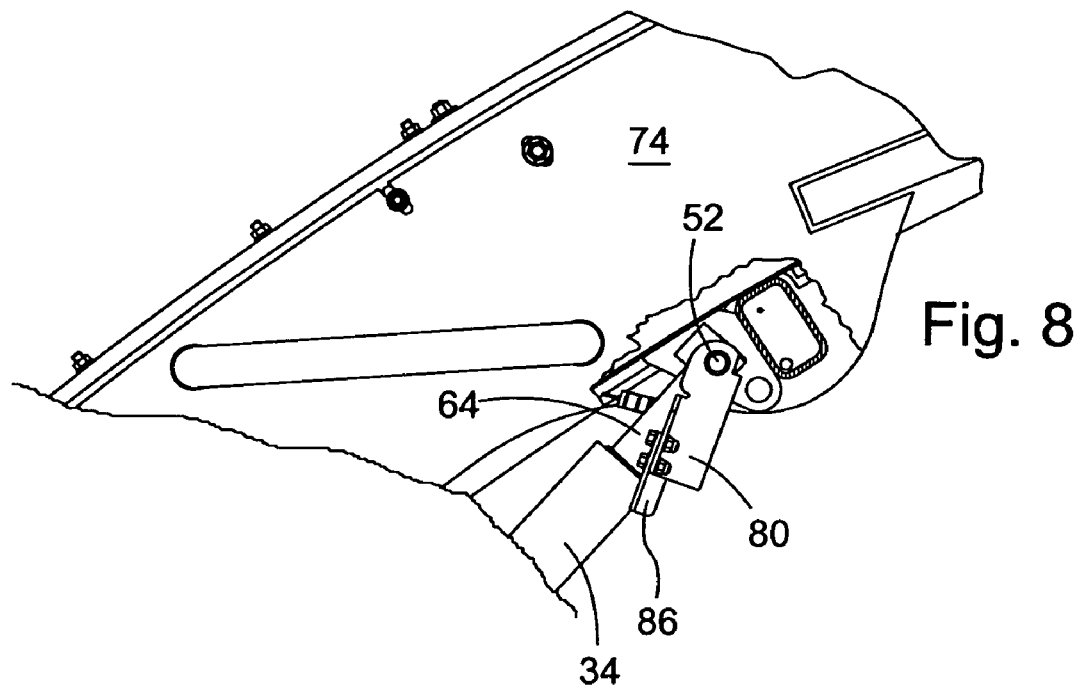
FIG. 8 is a side view of the discharge assembly and the actuator when an assembly adapted to limit the range of movement of the actuator is brought into its inactive position and the actuator is raised slightly relative to the position shown in FIGS. 3 and 4.
Figure 9:
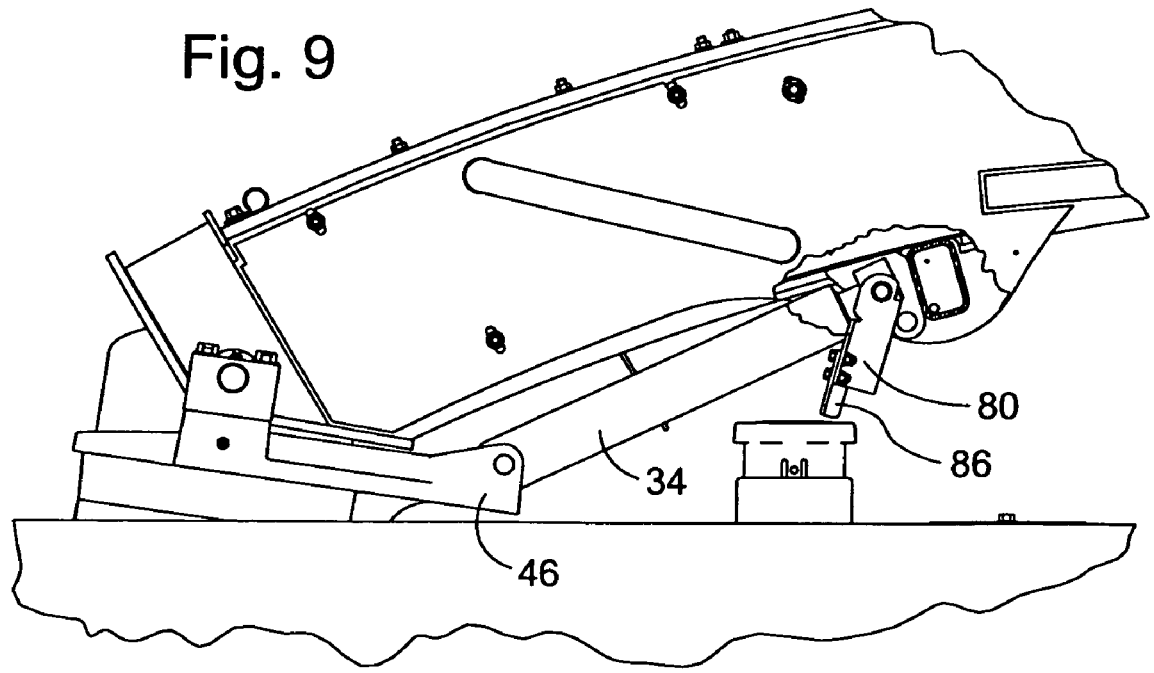
FIG. 9 is a side view of the discharge assembly and the actuator when an assembly adapted to limit the range of movement of the actuator is brought into its inactive position and the actuator is brought into the lowest loading position.

If the discharge assembly 26 is raised slightly from the position shown in FIGS. 1, 3 and 4, so that the cylinder of the actuator 34 no longer is in contact with the stop element 80, then the stop element 80 can be pivoted manually downward about the axis 52 against the force of the spring 92, that is, away from the sheet metal floor 56. Then the adjusting element 86 can also be extended manually. This position is shown in FIG. 8. The adjusting element 86 is forced against the upper edge of the cylinder of the actuator 34 by the force of the spring 92. Now the stop element 80 is no longer in its active position between the cylinder of the actuator 34 and the axis 52, but in an inactive position, such that the actuator 34 can be retracted below the position shown in FIGS. 1, 3 and 4, as shown in FIG. 9. Referring to FIG. 9, in this position the discharge assembly 26 can be positioned to the right or the left immediately to the side of the deposit assembly 62. This position is particularly appropriate for transporting the harvesting machine 10 on a truck, trailer, railroad freight car etc. in which only a limited height is available. FIG. 1 shows the discharge assembly 26' in dashed lines in the loading position.

Before loading the harvesting machine 10 the operator sets the actuator 34 in the position shown in FIG. 8. For this purpose an automatic assembly can be provided that controls this position upon a corresponding input or the actuation of an appropriate switch. The operator leaves the operator's cab 18 and proceeds to the discharge assembly 26 positioned immediately behind, pivots the stop element 80 and repositions the adjusting element 86. Subsequently the operator can return to the operator's cab 18 and move the discharge assembly 26 to the lowered loading position alongside the deposit assembly 62. The harvesting machine 10 can now be loaded without any problems.

If the discharge assembly 26 is again raised for a harvest by actuating the actuator 34, the spring 92 forces the stop element 80 against the sheet metal floor 56 into the position shown in FIGS. 3 and 4, as soon as the cylinder of the actuator 34 is no longer in contact with the adjusting element 86 and/or the stop element 80. Thus, the stop element 80 reaches its active position. During a subsequent lowering of the discharge assembly 26 by retracting the actuator 34, the weight of the discharge assembly 26 draws the adjusting element 86 into its retracted position, as soon as it comes into contact with the edge of the cylinder of the actuator 34. Therefore the position shown in FIGS. 3 and 4 is reached without any manual input.

In accordance with the provisions of the patent statutes, the present invention has been described in what is considered to represent its preferred embodiment. However, it should be noted that the invention can be practiced otherwise than as specifically illustrated and described.

What is claimed is:

1. A harvesting machine comprising:
    a support frame;
    a turning circle mounted to said support frame for being selectively rotated about a substantially vertical axis;
    a discharge assembly, for the transfer of harvested crop to a transport vehicle, having an inlet end and an outlet end, with said inlet end being coupled for rotation with said turning circle and for pivoting vertically, relative to said turning circle, about a generally horizontal axis, whereby said discharge assembly is mounted for pivoting vertically over a range of active positions, including a lower active position, and including positions located below said lower active position;
    an extensible and retractable actuator including a first component and a second component selectively shiftable relative to said first component, with said actuator having opposite ends respectively coupled to said turning circle and to said discharge assembly and being adapted to move the discharge assembly about said generally horizontal axis to vary the height of said outlet end of the discharge assembly; and
    a stop element being mounted in the vicinity of said actuator and being moveable between an active position and an inactive position, wherein when the stop element is in the active position the stop element is positioned for limiting the range of contraction of the actuator such that the discharge assembly cannot be moved to a position lower than said lower active position, and when the stop element is in the inactive position, the stop element does not limit the range of contraction of the actuator such that the discharge assembly can be moved to a position that is lower than the lower active position.

2. The harvesting machine according to claim 1, wherein the discharge assembly can be moved to a loading position for transporting the harvesting machine, the loading position being one of said positions located below said lower active position such that the stop element must be moved to the inactive position to allow the discharge assembly to be moved to the loading position.

3. The harvesting machine according to claim 2, and further including a deposit assembly mounted to said frame at a rear location spaced from said inlet end of said discharge assembly, with said deposit assembly including a support surface for receiving said discharge assembly, wherein the discharge assembly is positioned alongside said a deposit assembly on the rear side of the harvesting machine and below said a support surface of the deposit assembly when said discharge assembly is in the loading position.

4. The harvesting machine according to claim 1, wherein said stop element is so located relative to said first and second components of said stop element that said stop element can be moved to said active position from said inactive position only during the harvesting operation, when the discharge assembly is positioned above the lowest active position.

5. The harvesting machine according to claim 1, wherein said actuator is a hydraulic actuator, with said first and second components respectively being a cylinder and a piston rod, and when in the active position, the stop element being located between said a cylinder of the actuator and an axis at one end of said piston rod, with said piston rod of the cylinder being pivotally connected to the axis, and in the inactive position, the stop element is not being located between the cylinder of the actuator and the axis.

6. The harvesting machine according to claim 5, wherein the stop element is supported in bearings and is free to pivot about the axis.

7. The harvesting machine according to claim 1, wherein the stop element is preloaded in the active position.

8. The harvesting machine according to claim 1, and further including a retaining element associated with said stop element and selectively movable for retaining the stop element in the inactive position.

9. The harvesting machine according to claim 8, wherein said retaining element is an adjusting element attached to the stop element and moveable between a retracted position and an extended position, wherein the adjusting element retains the stop element in the inactive position when the adjusting element is moved to the extended position.

10. The harvesting machine according to claim 9, wherein the stop element can be moved to an inactive position when the discharge assembly is raised relative to the lower active position and the adjusting element, in the extended position, contacts a side region of the cylinder of the actuator.

11. The harvesting machine according to claim 9, wherein the adjusting element can be moved from the extended position into the retracted position by retracting the actuator.

12. The harvesting machine according to claim 8, wherein said retaining element is so located relative to the stop element that the stop element can be moved from the inactive position, to the active position, only after extending the actuator sufficiently for moving said discharge assembly above said lower active position.

* * * * *